United States Patent
Marçal

(10) Patent No.: US 12,384,891 B2
(45) Date of Patent: Aug. 12, 2025

(54) ADDITIVE CONTAINING LIQUID MASTERBATCH FORMULATIONS FOR POLYMER ARTICLES

(71) Applicant: CLARIANT PLASTICS & COATINGS BRAZIL, São Paulo (BR)

(72) Inventor: Edson Alexandre Marçal, São Paulo (BR)

(73) Assignee: Clariant Plastics & Coatings Brazil, São Paulo (BR)

( * ) Notice: Subject to any disclaimer, the term of this patent is extended or adjusted under 35 U.S.C. 154(b) by 691 days.

(21) Appl. No.: 17/761,350

(22) PCT Filed: Sep. 18, 2020

(86) PCT No.: PCT/BR2020/050370
§ 371 (c)(1),
(2) Date: Mar. 17, 2022

(87) PCT Pub. No.: WO2021/051180
PCT Pub. Date: Mar. 25, 2021

(65) Prior Publication Data
US 2022/0348697 A1    Nov. 3, 2022

(30) Foreign Application Priority Data

Sep. 18, 2019    (EP) ..................................... 19197942

(51) Int. Cl.
| C08J 3/205 | (2006.01) |
| C08J 3/22 | (2006.01) |
| C08K 5/00 | (2006.01) |
| C08L 23/06 | (2006.01) |
| C08L 25/06 | (2006.01) |

(52) U.S. Cl.
CPC ............. *C08J 3/2053* (2013.01); *C08J 3/226* (2013.01); *C08K 5/005* (2013.01); *C08L 23/06* (2013.01); *C08L 25/06* (2013.01); *C08J 2323/06* (2013.01); *C08J 2325/06* (2013.01)

(58) Field of Classification Search
CPC .................................................... C08J 3/2053
See application file for complete search history.

(56) References Cited

U.S. PATENT DOCUMENTS

| 4,418,168 A | * | 11/1983 | Johnson | ................. C08J 3/2053 |
| | | | | 524/109 |
| 5,096,201 A | * | 3/1992 | Egashira | ............ A63B 37/0006 |
| | | | | 473/372 |
| 8,137,592 B2 | | 3/2012 | Bastiaens et al. | |
| 11,365,302 B2 | | 6/2022 | Wartig et al. | |
| 2013/0272987 A1 | * | 10/2013 | Liu | ......................... A61K 8/375 |
| | | | | 514/762 |
| 2018/0002496 A1 | * | 1/2018 | Rule | ........................ C08K 3/26 |

FOREIGN PATENT DOCUMENTS

| CN | 102585450 A | 7/2012 |
| CN | 108495887 A | 9/2018 |
| EP | 0266754 A2 | 5/1988 |
| EP | 0331876 A2 | 9/1989 |
| EP | 3208298 A1 | 8/2017 |
| EP | 3268413 B1 | 2/2020 |
| WO | 2016/053833 A1 | 4/2016 |
| WO | WO-2017205948 A1 * | 12/2017 .............. C08J 3/203 |

OTHER PUBLICATIONS

International Search Report and Written Opinion dated Dec. 23, 2020, issued in corresponding International Patent Application No. PCT/BR2020/050370.

* cited by examiner

*Primary Examiner* — Marc S Zimmer
(74) *Attorney, Agent, or Firm* — Morgan, Lewis & Bockius LLP

(57) ABSTRACT

The invention relates to a thermoplastic resin composition comprising an additive formulation, the use of said formulation as a liquid additive concentrate in a thermoplastic resin composition, methods for improving specific properties of additives in a thermoplastic resin composition, the use of specific carriers for improving said properties, and a kit of parts for preparing a thermoplastic resin composition. In particular, specific carrier substances enhance the technical efficiency of additives, if these are introduced into polymers derived from ethylenically unsaturated monomers, such as polyolefins.

15 Claims, No Drawings

ADDITIVE CONTAINING LIQUID MASTERBATCH FORMULATIONS FOR POLYMER ARTICLES

The present invention relates to thermoplastic resin compositions comprising an additive formulation, the use of said formulation as a liquid additive concentrate in the preparation of thermoplastic resin compositions, methods for improving specific properties of additives in thermoplastic resin compositions, and the use of specific carriers for improving said properties.

Polymers are obtained directly from a polymerization process and often lack essential properties required for the final products produced therefrom. It is common practice to compound the polymer(s) with certain types of additive(s) which enhance specific physical, chemical, mechanical, esthetic and/or other properties of the polymer(s) and thus adjust them to the requirements for the final products. These additives are typically added in small amounts in comparison to the polymer component(s). However, the mere admixture of such additives to the polymers often pose technical difficulties in the manufacturing process because solubility, miscibility and/or compatibility of the additive(s) with the polymer(s) may be limited, and a homogeneous distribution of the additive(s) in the polymer(s) is not achieved.

A typical method for overcoming these problems is the use of a masterbatch, which is a concentrate of the additive(s) in certain carrier substance(s), see e.g. Plastics Additives Handbook (Hans Zweifel, Hanser, Munich, 6. Edition, 2009). These carrier substances are often composed of the polymer itself or other components that are compatible with the polymer. The concentrates of the additives in the carrier can be found in different physical forms, such as powders, free flowing forms, compact blends, pelletized solids or as liquids. They may be added to the polymers e.g. in the feeding or melting zone of the processing device, such as an extruder that transports, melts, dispersively mixes and homogenizes the additive(s) or concentrates thereof with the polymer matrix.

EP-A 0331876 discloses a process for manufacturing polyamide shaped articles, wherein a molten polyamide matrix is compounded with a liquid mixture of an additive and a polyester, particularly a color concentrate for mass-coloring polyamides. In CN-A 102585450, a coloring masterbatch is disclosed, which is used for coloring polyesters, wherein the carrier substance itself is also a polyester. In EP-A 0266754, a liquid masterbatch for coloring polyesters is described.

It has now been found, that specific carrier components enhance the technical efficiency of one or more additive(s), if these are introduced into polymer(s) derived from ethylenically unsaturated monomers, such as polyolefine polymers, in particular in comparison with the pure additive or with conventional, i.e. solid additive masterbatches. "Enhanced", "improved" or "increased" technical efficiency in the context of this inventions means that a smaller amount of additive(s) is required for the achievement of the same technical effect and/or that the same amount of additive(s) leads to an improvement of the technical effect of the additive.

The present invention provides a thermoplastic resin composition prepared from:
(I) 0.01 to 2 parts by weight, based on 100 parts by weight of components (I) and (II), of a liquid formulation comprising:
  (a) 20 to 99 parts by weight, based on 100 parts by weight of components (a) and (b), of at least one liquid carrier selected from the group consisting of: fatty acid esters of polyfunctional alcohols, synthetic oils, vegetable oils, animal oils, mineral oils, fatty acids, polyalkylene glycols, esters of polyalkylene glycols, silicones, polyolefins, modified rosin, alkyl esters of polyfunctional carboxylic acids, and water;
  and (b) 1 to 80 parts by weight, based on 100 parts by weight of components (a) and (b), of at least one additive, which is different from (a); and
(II) 98 to 99.99 parts by weight, based on 100 parts by weight of components (I) and (II) of a polymer containing repeating units derived from at least one ethylenically unsaturated monomer.

The invention further provides a thermoplastic resin composition containing the above components (I) and (II), and the use of a liquid formulation component (I) as defined above as a liquid additive concentrate in a thermoplastic resin composition comprising a polymer containing repeating units derived from at least one ethylenically unsaturated monomer.

Also, the invention relates to a method for improving the technical efficiency of an additive in a thermoplastic resin composition comprising the step of dispersing or dissolving the additive (b) in a liquid carrier component (a) as defined above prior to the introduction of the additive (b) into the thermoplastic resin composition.

Furthermore, a subject of the invention is a method for reducing the decomposition rate of an additive (b) in a thermoplastic resin composition due to thermal processing or ageing of the composition, comprising the step of dispersing or dissolving the additive (b) in a liquid carrier component (a) as defined above prior to the introduction of the additive (b) into the thermoplastic resin composition.

Another subject of the invention is the use of a liquid carrier component (a) as defined above for improving the technical efficiency and/or for reducing the decomposition rate of an additive (b) due to thermal processing or ageing in a thermoplastic resin composition.

Moreover, the invention relates to a kit of parts suitable for preparing a thermoplastic resin composition of the invention, containing (or consisting):
(I) a liquid formulation comprising:
  (a) 20 to 99 parts by weight, based on 100 parts by weight of components (a) and (b), of at least one liquid carrier selected from the group consisting of fatty acid esters of polyfunctional alcohols, synthetic oils, vegetable oils, animal oils, mineral oils, fatty acids, polyalkylene glycols, esters of polyalkylene glycols, silicones, polyolefins, modified rosin, alkyl esters of polyfunctional carboxylic acids, polyesters and water; and
  (b) 1 to 80 parts by weight, based on 100 parts by weight of components (a) and (b), of at least one additive, which is different from (a); and
(II) a polymer containing repeating units derived from at least one ethylenically unsaturated monomer.

The thermoplastic resin composition of the invention can be prepared from 0.01 to 2, preferably 0.02 to 1, preferably 0.03 to 0.5, more preferably 0.04 to 0.3 parts by weight, based on 100 parts by weight of components (I) and (II), of a liquid formulation (I) and 98 to 99.99, preferably 99 to 99.98, more preferably 99.5 to 99.97, more preferably 99.7 to 99.96 parts by weight, based on 100 parts by weight of components (I) and (II), of a polymer containing repeating units derived from at least one ethylenically unsaturated monomer.

In a particularly preferred embodiment, the thermoplastic resin composition is prepared from 0.04 to 0.3 parts by weight, based on 100 parts by weight of components (I) and (II), of the liquid formulation (I) and 99.7 to 99.96 parts by weight, based on 100 parts by weight of components (I) and (II), of the polymer containing repeating units derived from at least one ethylenically unsaturated monomer.

The term "liquid" according to the invention refers to the liquid state of matter of the material described as "liquid" at 25° C., unless a different temperature is mentioned in the specific context.

Of these components, the liquid formulation (I) comprises 20 to 99, preferably 25 to 99, more preferably 30 to 99, even more preferably 90 to 99 parts by weight, based on 100 parts by weight of components (a) and (b), of at least one liquid carrier (a), and from 1 to 80, preferably 1 to 75, more preferably 1 to 70, even more preferably 1 to 10 parts by weight, based on 100 parts by weight of components (a) and (b), of at least one additive (b).

In a preferred embodiment, the liquid formulation (I) comprises 35 to 70 parts by weight, based on 100 parts by weight of components (a) and (b), of the at least one liquid carrier (a) and 30 to 65 parts by weight, based on 100 parts by weight of components (a) and (b), of the at least one additive (b).

The liquid carrier (a) is selected from the group consisting of fatty acid esters of polyfunctional alcohols, synthetic oils, vegetable oils, animal oils, mineral oils, fatty acids, polyalkylene glycols, esters of polyalkylene glycols, silicones, polyolefins, modified rosin, alkyl esters of polyfunctional carboxylic acids, polyesters and water.

Preferable fatty acid esters of polyfunctional alcohols used as liquid carrier (a) are monoesters or oligoesters of at least one carboxylic acid having a saturated or unsaturated, preferably unsaturated, linear or branched alkyl group with from 8 to 30, preferably from 10 to 26, more preferably from 12 to 22, more preferably from 14 to 20 carbon atoms, and at least one polyfunctional alcohol having from 2 to 10, preferably from 2 to 6, more preferably from 3 to 6, more preferably from 3 to 5 hydroxyl groups. In preferred embodiments, the fatty acid ester of polyfunctional alcohols is selected from monoesters or oligoesters of at least one carboxylic acid having a saturated or unsaturated, preferably unsaturated linear or branched alkyl group with from 14 to 20 carbon atoms and sorbitan or ethoxylated sorbitan, wherein ethoxylated sorbitan preferably has a number-average number of from 1 to 20, more preferably from 2 to 15, even more preferably from 3 to 10 ethylene oxide units per molecule of sorbitan.

In preferred embodiments, the fatty acid esters of polyfunctional alcohols are selected from the group consisting of sorbitan monooleate, sorbitan dioleate, sorbitan trioleate, ethoxylated sorbitan monooleate, ethoxylated sorbitan dioleate and ethoxylated sorbitan trioleate, wherein ethoxylated sorbitan preferably has a number-average number of from 1 to 20 ethylene oxide units per molecule of sorbitan.

In particularly preferred embodiments, the fatty acid esters of polyfunctional alcohols are selected from the group consisting of sorbitan monooleate, sorbitan trioleate, ethoxylated sorbitan monooleate and ethoxylated sorbitan trioleate, wherein ethoxylated sorbitan preferably has a number-average number of from 3 to 10 ethylene oxide units per molecule of sorbitan.

Preferable vegetable oils used as liquid carrier (a) are monoesters, diesters or triesters of glycerol with at least one fatty acid molecules having a saturated or unsaturated, preferably unsaturated, linear or branched alkyl group with from 8 to 30, preferably from 10 to 26, more preferably from 12 to 22, even more preferably from 14 to 20 carbon atoms.

In preferred embodiments, the vegetable oils are selected from the group consisting of canola oil, rapeseed oil, Grindsted® oil, palm oil, soybean oil, sunflower oil, olive oil, corn oil, cottonseed oil, peanut oil, sesame oil, rice bran oil, coconut oil, palm kernel oil, avocado oil, flaxseed oil, linseed oil, grape seed oil, hemp seed oil and safflower oil, or derived therefrom. In particularly preferred embodiments, the vegetable oils are selected from canola oil and Grindsted® oil, such as, e.g. Grindsted® Soft-n-Safe distributed by Danisco. Among the animal oils, fish oil is preferred.

Preferable fatty acids used as liquid carrier (a) are carboxylic acids having a saturated or unsaturated, preferably unsaturated, linear or branched alkyl group with from 8 to 30, preferably from 10 to 26, more preferably from 12 to 22, even more preferably from 14 to 20 carbon atoms. In a particularly preferred embodiment, the fatty acid used as liquid carrier (a) is oleic acid.

Preferable polyalkylene glycols used as liquid carrier (a) are polyethylene glycol and polypropylene glycol having a number-average molecular weight, measured by gel permeation chromatography (GPC) with polyethylene glycol as a reference standard of from 150 to 1000 g/mol, preferably from 175 to 500, g/mol, more preferably 180 to 250 g/mol. In a particularly preferred embodiment, the polyalkylene glycol used as liquid carrier (a) is polyethylene glycol with a number-average molecular weight, measured by gel permeation chromatography (GPC) with polyethylene glycol as a reference standard, of from 180 to 250 g/mol.

Preferable esters of polyalkylene glycols used as liquid carrier (a) are esters of polyethylene glycol and polypropylene glycol having a number-average molecular weight, measured by gel permeation chromatography (GPC) with polyethylene glycol as a reference standard, of from 150 to 1000 g/mol, preferably from 175 to 500, g/mol, more preferably 180 to 250 g/mol with carboxylic acids having a saturated or unsaturated, linear or branched alkyl group with from 1 to 30, preferably from 2 to 20, more preferably from 3 to 15, even more preferably from 5 to 10 carbon atoms. In particularly preferred embodiments, the esters of polyalkylene glycols used as liquid carrier (a) are esters of polyethylene glycol with number-average molecular weight, measured by gel permeation chromatography (GPC) with polyethylene glycol as a reference standard, of from 180 to 250 g/mol, with carboxylic acids having a saturated or unsaturated, linear or branched alkyl group with from 3 to 15 carbon atoms.

Preferable silicones used as liquid carrier (a) are polydialkylsiloxanes or cyclo-polydialkylsiloxanes with the alkyl having from 1 to 6, preferably from 1 to 3, even more preferably 1 carbon atom. In preferred embodiments, the silicones are polydimethylsiloxanes or cyclopolydimethylsiloxanes having a kinematic viscosity at 25° C., measured according to DIN 53019, of 100 to 1000 $mm^2s^{-1}$, preferably of from 150 to 500 $mm^2s^{-1}$, more preferably of from 180 to 250 $mm^2s^{-1}$. An example of a commercially available silicone is WACKER® AK 200 Silicone Fluid distributed by Wacker.

Preferable polyolefins used as liquid carrier (a) are polymers of linear or branched olefins having from 2 to 6, preferably from 2 to 4 carbon atoms, more preferably butylene or isobutylene. In preferred embodiments, the polyolefins have a number-average molecular weight, measured by gel permeation chromatography (GPC) with polyisobutylene as a reference standard, of from 150 to 600 g/mol, preferably from 250 to 500 g/mol, more preferably from 300 to 450 g/mol, even more preferably from 350 to 400 g/mol. Examples of commercially available polyolefins are Braskem PIB 6 distributed by Braskem and Indopol® L14 distributed by INEOS.

Preferable alkyl esters of polyfunctional carboxylic acids used as liquid carrier (a) are those, wherein each of the carboxylic acid groups of the polyfunctional carboxylic acid is esterified with an alkyl alcohol. This polyfunctional carboxylic acid comprises from 2 to 4, preferably from 2 to 3, more preferably 2 carboxylic acid groups connected by a saturated or unsaturated, linear, branched or cyclic alkylene group or an arylene group having from 2 to 20, preferably from 2 to 15, more preferably from 4 to 10 carbon atoms.

The alkyl alcohol, with which the polyfunctional carboxylic acid is esterified, preferably has a saturated or unsaturated, linear, branched or cyclic alkyl group with preferably 2 to 15, more preferably 2 to 10 carbon atoms. In preferred embodiments, the alkyl esters of polyfunctional carboxylic acids used as liquid carrier (a) are selected from $C_2$-$C_{10}$ alkyl esters of difunctional carboxylic acids having 4 to 10 carbon atoms.

In preferred embodiments, the alkyl esters of polyfunctional carboxylic acids used as liquid carrier (a) are selected from $C_2$-$C_{10}$ alkyl esters of adipic acid, phthalic acid, isophthalic acid, terephthalic acid and cyclohexane-dicarboxylic acids. In particularly preferred embodiments, the alkyl esters of polyfunctional carboxylic acids used as liquid carrier (a) are selected from the group consisting of dioctyl adipate, diethyl phthalate, dioctyl terephthalate and 1,2-cyclohexane dicarboxylic acid diisononyl ester.

Preferable polyesters used as liquid carrier (a) are polycondensation products of alkylene glycols having from 2 to 6, preferably from 2 to 4, more preferably from 2 to 3, even more preferably 2 carbon atoms with difunctional carboxylic acids having from 4 to 15, preferably from 4 to 10, more preferably from 4 to 8 carbon atoms. In preferred embodiments, the polyesters used as liquid carrier (a) are polycondensation products of ethylene glycol and difunctional carboxylic acids having from 4 to 8 carbon atoms. In a preferred embodiment the polyester used as liquid carrier (a) is a polyethylene adipate with a number-average molecular weight, measured by gel permeation chromatography (GPC) with polyethylene terephthalate as a reference standard, of from 200 to 1000 g/mol, preferably from 400 to 800 g/mol, more preferably from 500 to 700 g/mol.

Preferably, the at least one liquid carrier (a) of the liquid formulation (I) is selected from the group consisting of sorbitan monooleate, ethoxylated sorbitan monooleate, sorbitan trioleate, ethoxylated sorbitan trioleate, polybutylene, polyisobutylene, canola oil, grindsted oil, mineral oil, water, oleic acid, soybean oil, modified rosin, polyethylene glycol, polyethylene glycol esters, silicones, dioctyl terephthalate, 1,2-cyclohexane dicarboxylic acid diisononyl ester, dioctyl adipate, polyethylene adipate and diethyl phthalate.

More preferably, the at least one liquid carrier (a) of the liquid formulation (I) is selected from the group consisting of sorbitan monooleate, ethoxylated sorbitan monooleate, sorbitan trioleate, ethoxylated sorbitan trioleate, polybutylene, polyisobutylene, canola oil, grindsted oil, mineral oil, oleic acid, soybean oil, modified rosin, silicones, dioctyl terephthalate, 1,2-cyclohexane dicarboxylic acid diisononyl ester, dioctyl adipate, and diethyl phthalate. Even more preferably, the liquid carrier (a) of the liquid formulation (I) is selected from the group consisting of polybutylene and polyisobutylene.

The at least one additive (b) of the liquid formulation (I) is different from the liquid carrier (a) and is preferably selected from the group consisting of primary antioxidants, secondary antioxidants, polymer process aids (PPA), slip additives, antistatic additives, neutralizing agents, hindered amine light stabilizers (HALS), UV absorbers, chemical foaming agents, antifog additives, tackifying agents, surface modifiers and colorants.

Preferably, the primary antioxidants are selected from sterically hindered monophenolic antioxidants, such as octadecyl-3-(3,5-di-tert-butyl-4-hydroxyphenyl)-propionate, and sterically hindered tetraphenolic antioxidants such as pentaerythritol tetrakis (3-(3,5-di-tert-butyl-4-hydroxyphenyl)propionate). Examples of commercially available primary antioxidants are Irganox® 1076 distributed by BASF, Songnox® 1076 distributed by Songwon, Irganox® 1010 distributed by BASF and Songnox® 1010 distributed by Songwon.

Preferably, the secondary antioxidants are selected from the group of phosphites or phosphonites, in particular triphenyl phosphites or triphenyl phosphonites such as tris (nonylphenyl)phosphite, tris(2,4-di-tert-butylphenyl) phosphite and tetrakis(2,4-di-tert-butylphenyl)-4,4'-biphenyldiphosphonite. Examples of commercially available secondary antioxidants are Irgaphos® 168 distributed by BASF, Songnox® 1680 distributed by Songwon, Hostanox® P-EPQ distributed by Clariant, Irgaphos® P-EPQ distributed by BASF and Songnox® PQ distributed by Songwon.

Preferably, the polymer process aids are selected from fluoropolymers, such as polyvinylidene fluoride (PVDF) and fluoroelastomers optionally mixed with polyethylene glycol. Preferably, the slip additives are selected from fatty acid amides or dicarboxylic acid diamides having from 12 to 30 carbon atoms, preferably 14 to 25 carbon atoms, more preferably 16 to 22 carbon atoms, which may be saturated or unsaturated. Particularly preferred slip additives are selected from the group consisting of erucamide, behenamide and oleamide.

Preferably, the antistatic additives are selected from $C_{12}$-$C_{30}$, preferably $C_{14}$-$C_{25}$, more preferably $C_{16}$-$C_{22}$ fatty acid monoesters of glycerol, of which glycerol monostearate is preferred, modified amines and alkanosulphonated compounds.

Preferably, the neutralizing agents are selected from carboxylic acid salts or carbonates of mono-, di- or trivalent metal cations, preferably carboxylic acid salts or carbonates of di- or trivalent metal cations, more preferably from carboxylic acid salts or carbonates of calcium, zinc, magnesium and/or aluminum, even more preferably stearates of calcium, zinc and/or magnesium and/or hydrotalcites.

Preferably, the hindered amine light stabilizers (HALS) are selected from monomeric and oligomeric modified tertiary amines often used in blends with UV absorbers based on benzophenones, benzotriazoles and/or triazines. Preference is given to N—H type HALS, N—R-type HALS and N—OR-type HALS. Examples of commercially available hindered amine light stabilizers are Tinuvin® 123, Tinuvin® 144 and Tinuvin® 292 distributed by BASF.

Preferably, the UV absorbers are based on benzophenones, benzotriazoles and triazines that are often used in blends with hindered amine light stabilizers. Specific examples of the benzophenone-based ultraviolet absorber include, 2,4-dihydroxy benzophenone, 2,2',4,4'-tetrahydroxy benzophenone, 2-hydroxy-4-(β-hydroxyethoxy)-benzophenone, bis(5-benzoyl-4-hydroxy-2-methoxyphenyl) methane, 2-hydroxy-4-methoxybenzophenone, 2,2'-dihydroxy-4-methoxybenzophenone, 2-hydroxy-4-octyloxybenzophenone, and 2-hydroxy-4-n- octyloxybenzophenone. Among these, bis(5-benzoyl-4-hydroxy-2-methoxyphenyl)methane and 2,2',4,4'-tetrahydroxy benzophenone are particularly preferable. Specific examples of the benzotriazole-based ultraviolet absorber include 2-(5-chloro-2-benzotriazol)-6-tert-butyl-p-cresol, 2-(5-methyl-2-hyd roxyphenyl)benzotriazol, 2-[3,5-bis(2,2-dimethylpropyl)-2-hydroxyphenyl] benzotriazol, 2-(3-tertiary butyl-5-methyl-2-hydroxyphenyl)-5-chlorobenzotriazol, 2-(3,5-ditertiary butyl-2-hydroxyphenyl)-5-chlorobenzotriazol, 2-[2-hydroxy-3,5-bis($\alpha,\alpha$-dimethylbenzyl)phenyl]-2H-benzotriazol, 2,2-methylenebis[4-(1,1,3,3-tetramethylbutyl)-6-(2H-benzotriazol-2-yl)phenol], 2-(3-tert-butyl-2-hydroxy-5-methylphenyl)-5-chloro-2H-benzotriazol, 2,2'-methylenebis [441,1,3,3-tetramethylbuthyl)-6-[(2H-benzotriazol-2-yl) phenol]], 2-(2'-hydroxy-5'-methylphenyl)benzotriazol, 2(2'-hydroxy-3-$^1$-tert-butyl-5'-methylphenyl)-5-chlorobenzotriazol, and 2-(2-hydroxy-5-methylphenyl)benzotriazol. Among these, 2-[2-hydroxy-3,5-bis($\alpha,\alpha$-dimethylbenzyl)phenyl]-2H-benzotriazol, 2,2-methylenebis[4-(1,1,3,3-tetramethylbutyl)-6-(2H-benzotriazol-2-yl)phenol], and 2[5-chloro(2H)-benzotriazol-2-yl]-4-methyl-6-(tert-butyl)phenol are preferable. Specific examples of the triazine-based ultraviolet absorber include 2,4,6-tris(2-hydroxy-4-hexyloxy-3-methylphenyl)-1,3,5-triazine, 2-[2-hydroxy-4-(hexyloxy)phenol]-4,6-diphenyl-1,3,5-triazine, and 2-(4,6-diphenyl-1,3,5-triazine-2-yl)-5-[2-(2-ethyl hexyloxy)ethoxy]phenol. Among these, 2,4-bis(2,4-dimethylphenyl)-6-(2-hydroxy-4-n-octyloxyphenyl-1,3,5-triazine is preferable.

Preferably, the chemical foaming agents are selected from sodium bicarbonate, sodium citrate and citric acid.

Preferably, the antifog additives are selected from modified amines preferably alkoxylated amines, more preferably ethoxylated amines, even more preferably ethoxylated alkylamines. An example of a commercially available antifog additive is SaboStab®, distributed by Biesterfeld.

Preferably, the tackifying agents are selected from polyisobutenes or polybutylenes having number-average molecular weights, measured by gel permeation chromatography (GPC) with polyisobutylene as a reference standard, of from 800 to 2000 g/mol, preferably of from 1000 to 1800 g/mol, more preferably of from 1100 to 1500 g/mol. Examples of commercially available tackifying agents are Braskem PIB 32 distributed by Braskem and Indopol® H300 distributed by INEOS.

Preferably, the surface modifiers are selected from silicones with high viscosity, preferably polydialkylsiloxanes or cyclo-polydialkylsiloxanes with high viscosity, with the alkyl having from 1 to 6, preferably from 1 to 3, even more preferably 1 carbon atom. The silicones with high viscosity typically have a kinematic viscosity at 25° C., measured according to DIN 53019, of 5000 to 20000 $mm^2s^{-1}$, preferably of from 7500 to 17500 $mm^2s^{-1}$, more preferably of from 10000 to 15000 $mm^2s^{-1}$. An example of a commercially available silicone with high viscosity is WACKER® AK 12500 Silicone Fluid distributed by Wacker.

Preferably, the colorants are selected from organic and inorganic pigments and dyes. These can be used in any colors, such as yellow, blue, green, orange, red, brown, black, white, or mixtures of two or more thereof.

The at least one additive (b) of the liquid formulation (I) is preferably selected from the group consisting of primary antioxidants, secondary antioxidants, polymer process aids (PPA), slip additives and chemical foaming agents.

The at least one ethylenically unsaturated monomer from which the repeating units of the polymer (II) are derived is preferably selected from the groups consisting of ethylene, alpha-olefins and styrene, more preferably ethylene, alpha-olefins comprising 3 to 6 carbon atoms and styrene, even more preferably ethylene, alpha-olefins comprising 3 or 4 carbon atoms and styrene.

According to the invention, the liquid formulation component (I) as described above can be used as a liquid additive concentrate for preparing thermoplastic resin compositions comprising a polymer containing repeating units derived from at least one ethylenically unsaturated monomer, e.g. the polymer (II) as described above.

One major benefit of using the liquid formulation component (I) for preparing such thermoplastic resin compositions is that the additive (b) can typically be dissolved or dispersed in the liquid carrier (a) at higher concentrations than in other carriers, especially than in solid carriers. Therefore, if the liquid formulation component (I) is used, the introduction of a specific amount of additives into the thermoplastic resin composition requires a smaller amount of the concentrate, than in the case of a solid additive masterbatch.

Furthermore, it has been found that the use of component (a) as a liquid carrier in additive concentrates also increases the technical efficiency of the at least one additive (b) in thermoplastic resin compositions, specifically those comprising the polymer (II) described above. This can be seen by the overall smaller amount of the additive (b) required for achieving the same results as with solid masterbatches.

Another benefit of using a liquid carrier (a) in additive concentrates is that dissolution or dispersion of the additive (b) in the liquid carrier (a) can be performed at lower temperatures than in case of solid carriers.

Thus, the additives (b), which are often sensitive to thermal processing and ageing, are not subjected to high temperatures before they are introduced into a thermoplastic resin composition, specifically one comprising the polymer (II) described above. By avoiding an unnecessary thermal processing step, the decomposition rate of the additive (b) in the thermoplastic resin composition due to thermal processing or ageing of the composition is significantly reduced.

The benefits of the present invention are described in more detail by the examples and the claims. In the examples, 1 part by weight can e.g. denote 100 g.

EXAMPLES

Comparative Example 1

3 parts by weight of a polymer processing aid (Kynar Flex® 5301 distributed by Arkema) 4 parts by weight of a secondary antioxidant (Irgafos® 168 distributed by BASF) and 1.5 parts by weight of a primary antioxidant (Irganox® 1076 distributed by BASF) were dispersed in 91.5 parts by weight of molten polyethylene (Braskem LLDPE IC32 distributed by Braskem) using a twin screw and pelletized to give a solid masterbatch (C-1).

Example 1

18 parts by weight of a polymer processing aid (Kynar Flex® 5301 distributed by Arkema) 24 parts by weight of a secondary antioxidant (Irgafos® 168 distributed by BASF) and 6 parts by weight of a primary antioxidant (Irganox® 1076 distributed by BASF) were dispersed in 52 parts by weight of a liquid polybutylene carrier (Braskem PIB 6 distributed by Braskem) using a MorehouseCowles disperser and a basket mill to give a liquid formulation (I-1).

Comparative Example 2

2 parts by weight of the solid masterbatch (C-1) obtained in comparative example 1 were mixed with 98 parts by weight of LDPE (Braskem TX7003 distributed by Braskem) in a single screw extruder to give a thermoplastic resin composition (R—C1) comprising 600 ppm of the polymer process aid, 800 ppm of the secondary antioxidant and 300 ppm of the primary antioxidant. (R—C1) was continuously fed into a stretch cast film production line to obtain a stretch cast film (P—C1). The production line had to be stopped for mechanical cleaning after 45 days of continuous operation due to enrichment of thermal decomposition products. Both resin and masterbatch must be melted thus resulting in a difficult mixing of the additives that are intended to protect the resin and the masterbatch itself, and resulting in a higher degree of degradation of the overall polymer formulation that used for the cast film production.

Example 2

0.05 parts by weight of the liquid formulation (I-1) obtained in example 1 were mixed with 99.95 parts by weight of LDPE (Braskem TX7003 distributed by Braskem) in a single screw extruder to give a thermoplastic resin composition (R-1) comprising 90 ppm of the polymer process aid, 120 ppm of the secondary antioxidant and 30 ppm of the primary antioxidant. (R-1) was continuously fed into a stretch cast film production line to obtain a stretch cast film (P-1). The production line had to be stopped for mechanical cleaning after 120 days of continuous operation due to enrichment of thermal decomposition products. Since the liquid masterbatch does not undergo thermal stress during its preparation and also does not need to be melted before being added to the resin, it already starts protecting the polymer during the mixing, resulting in better performance, despite smaller quantities of additives admixed to the polymer during the cast film production.

From the above example 2 and comparative example 2, it is evident, that despite the smaller amount of additives and carrier used in the inventive example, which is an economical advantage, a technical advantage of improved processability and reduced rate of decomposition is observed, if the liquid formulation (I-1) is used instead of the solid masterbatch (C-1).

Comparative Example 3

2 parts by weight of a slip additive (erucamide) were dispersed in 98 parts by weight of molten LLDPE (Braskem IC32 distributed by Braskem) using a twin screw extruder to give a solid masterbatch (C-2).

Example 3

40 parts by weight of a slip additive (erucamide) were dispersed in 60 parts by weight of a polyisobutylene carrier (Braskem PIB 6 distributed by Braskem) using a MorehouseCowles disperser to give a liquid formulation (I-2).

Comparative Example 4

3 parts by weight of the solid mast masterbatch (C-2) obtained in comparative example 3 were mixed with 97 parts by weight of LDPE (Braskem TX7003 distributed by Braskem) in a single screw extruder to give a thermoplastic resin composition (R—C2) comprising 600 ppm of the slip additive (erucamide). (R—C2) was continuously fed into a blow film production line to obtain a blow film (P—C2). The coefficient of friction of the blow film immediately after production was 0.23.

After 1 month of storage in a warehouse, the coefficient of friction increased to 0.25. Coefficient of friction is a dimensionless measure of the ability of one layer of film to move between other layers of film or along a fixed surface. Since erucamide is a migrating additive, the speed of its migration to the surface of the film and consequent buildup of this erucamide layer allow easier slip between film layers in a bobbin or between the film and a fixed surface.

Example 4

0.15 parts by weight of the liquid formulation (1-2) obtained in example 3 were mixed with 99.85 parts by weight of LDPE (Braskem TX7003, a low-density, high molecular weight polyethylene, MFR (190°/2.16 kg; D1238) of 0.27 g/10 min; distributed by Braskem) in a single screw extruder to give a thermoplastic resin composition (R-2) comprising 600 ppm of the slip additive (erucamide). (R-2) was continuously fed into a blow film production line to obtain a blow film (P-2). The coefficient of friction of the blow film immediately after production was 0.17.

After 1 month of storage in a warehouse, the coefficient of friction remained 0.17. Thus the liquid carrier led to better uniformity of the erucamide along the surface of the film, resulting in more controlled migration of the additive. Thus, the overall product performance is improved by using a liquid carrier for the additive.

From the above example 4 and comparative example 4, it is evident, that despite the same amount of additives and reduced amount of carrier used in the inventive example, which is an economical advantage, a technical advantage of an improved coefficient of friction and an improved storage stability in view of the coefficient of friction are achieved, if the liquid formulation (1-2) is used instead of the solid masterbatch (C-2).

Comparative Example 5

20 parts by weight of a chemical foaming agent (sodium citrate) were dispersed in 80 parts by weight of molten polystyrene (innova N 1921 distributed by innova) using a twin-screw extruder to give a solid masterbatch (C-3).

Example 5

40 parts by weight of a chemical foaming agent (sodium citrate) were dispersed in 60 parts by weight of mineral oil carrier using a MorehouseCowles disperser and milled at a basket mill afterwards to give a liquid formulation (1-3).

Comparative Example 6

3 parts by weight of the liquid formulation (C-3) obtained in example 5 were mixed with 97 parts by weight of polystyrene (U8815 distributed by Unigel) in a single screw extruder to give a thermoplastic resin composition (R—C3) comprising 6000 ppm of the chemical foaming agent (sodium citrate). (R—C3) was continuously fed into a production line for a 3-layer polystyrene sheet for yoghurt containers, as the intermediate layer material. The overall density of the 3-layer polystyrene sheet (P—C3) was reduced by 18% in comparison to the corresponding sheet without a foaming agent. Layer thickness proportions were 20/60/20 and the total sheet thickness was 1.05 mm.

Example 6

0.8 parts by weight of the liquid formulation (I-3) obtained in example 5 were mixed with 98.2 parts by weight of polystyrene (U8815 distributed by Unigel) in a single screw extruder to give a thermoplastic resin composition (R-3) comprising 3200 ppm of the chemical foaming agent (sodium citrate). (R-3) was continuously fed into a production line for a 3-layer polystyrene sheet (P-3) for yoghurt containers, as the intermediate layer material.

The overall density of the 3-layer polystyrene sheet was reduced by 18% in comparison to the corresponding sheet without a foaming agent. The size of gas bubbles in (P-3) was smaller and more homogeneous than the size of gas bubbles in (P—C3), affecting mechanical properties to a lesser degree and resulting in better finishing of the produced part. Also, the same density reduction was achieved using less of the additive.

From the above example 6 and comparative example 6, it is evident, that despite the smaller amount of additives and reduced amount of carrier used in the inventive example, which is an economical advantage, the weight reduction of the product is not affected, and a technical advantage of smaller and more homogeneous gas bubbles is achieved, if the liquid formulation (I-3) is used instead of the solid masterbatch (C-3).

The invention claimed is:

1. A thermoplastic resin composition comprising:
(I) a liquid formulation including:
(a) at least one liquid carrier comprising at least one selected from the group consisting of liquid polybutylene and liquid polyisobutylene; and
(b) at least one additive, which is different from the at least one liquid carrier (a), comprising at least one selected from the group consisting of primary antioxidants, secondary antioxidants, polymer process aids (PPA), slip additives, and chemical foaming agents; and
(II) a polymer containing repeating units derived from at least one ethylenically unsaturated monomer,
wherein the at least one liquid carrier (a) is from 90 to 99 parts by weight and the at least one additive (b) is from 1 to 10 parts by weight, based on 100 parts by weight of the at least one liquid carrier (a) and the at least one additive (b), and
wherein the liquid formulation (I) is from 0.01 to 2 parts by weight and the polymer (II) is from 98 to 99.99 parts by weight, based on 100 parts by weight of liquid formulation (I) and polymer (II).

2. The thermoplastic resin composition according to claim 1, wherein the at least one liquid carrier (a) comprises liquid polybutylene.

3. The thermoplastic resin composition according to claim 1, wherein the at least one liquid carrier (a) comprises liquid polyisobutylene.

4. The thermoplastic resin composition according to claim 1, wherein the repeating units derived from an ethylenically unsaturated monomer in the polymer (II) are selected from the group consisting of ethylene, alpha-olefins, and styrene.

5. A liquid formulation (I) for use as a liquid additive concentrate in a thermoplastic resin composition having a polymer containing repeating units derived from at least one ethylenically unsaturated monomer, the liquid formulation component (I) comprising:
at least one liquid carrier comprising at least one selected from the group consisting of liquid polybutylene and liquid polyisobutylene; and
(b) at least one additive, which is different from the at least one liquid carrier (a), comprising at least one selected from the group consisting of primary antioxidants, secondary antioxidants, polymer process aids (PPA), slip additives. and chemical foaming agents,
wherein the at least one liquid carrier (a) is from 90 to 99 parts by weight and the at least one additive (b) is from 1 to 10 parts by weight, based on 100 parts by weight of the at least one liquid carrier (a) and the at least one additive (b).

6. A kit of parts for preparing a thermoplastic resin composition according to claim 1, the kit containing:
a first container including the liquid formulation (I); and
a second container including the polymer (II).

7. A preparation for a thermoplastic resin composition, the preparation comprising:
(I) a liquid formulation including:
(a) at least one liquid carrier comprising at least one selected from the group consisting of liquid polybutylene and liquid polyisobutylene; and
(b) at least one additive, which is different from (a), comprising at least one selected from the group consisting of primary antioxidants, secondary antioxidants, polymer process aids (PPA), slip additives, and chemical foaming agents; and
(II) a polymer containing repeating units derived from at least one ethylenically unsaturated monomer,
wherein the at least one liquid carrier (a) is from 90 to 99 parts by weight and the at least one additive (b) is from 1 to 10 parts by weight, based on 100 parts by weight of the at least one liquid carrier (a) and the at least one additive (b), and
wherein the liquid formulation (I) is from 0.01 to 2 parts by weight and the polymer (II) is from 98 to 99.99 parts by weight, based on 100 parts by weight of formulation (I) and polymer (II).

8. A thermoplastic resin formed from the preparation of claim 7.

9. The preparation according to claim 7, wherein the at least one liquid carrier (a) comprises liquid polybutylene.

10. The preparation according to claim 7, wherein the at least one liquid carrier (a) comprises liquid polyisobutylene.

11. The preparation according to claim 7, wherein the at least one liquid carrier (a) comprises liquid polybutylene and liquid polyisobutylene.

12. The thermoplastic resin composition according to claim 1, wherein the at least one liquid carrier (a) comprises liquid polybutylene and liquid polyisobutylene.

13. The liquid formulation according to claim 5, wherein the at least one liquid carrier (a) comprises liquid polybutylene.

14. The liquid formulation according to claim 5, wherein the at least one liquid carrier (a) comprises liquid polyisobutylene.

15. The liquid formulation according to claim 5, wherein the at least one liquid carrier (a) comprises liquid polybutylene and liquid polyisobutylene.

* * * * *